(12) United States Patent
Möker

(10) Patent No.: US 6,250,680 B1
(45) Date of Patent: Jun. 26, 2001

(54) PASSENGER SAFETY BELT RESTRAINT ARRANGEMENT

(75) Inventor: Carsten Möker, Rühen (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 09/602,450

(22) Filed: Jun. 23, 2000

Related U.S. Application Data

(63) Continuation of application No. PCT/EP98/07358, filed on Nov. 17, 1998.

(30) Foreign Application Priority Data

Jan. 2, 1998 (DE) ................................ 198 00 071

(51) Int. Cl.$^7$ ............................ B60R 22/20; B60R 22/26
(52) U.S. Cl. .................... 280/801.2; 280/808; 297/483
(58) Field of Search ................. 280/801.1, 801.2, 280/808; 297/216.1, 468, 483

(56) References Cited

U.S. PATENT DOCUMENTS 3,471,197 * 10/1969 Ely .
3,907,059 * 9/1975 Takada ................................ 280/802
4,213,636 * 7/1980 Sacco et al. ...................... 280/801.2
4,846,498 * 7/1989 Fohl ................................... 280/801.2
5,645,316 * 7/1997 Aufrere et al. ................. 297/216.13
5,743,597 * 4/1998 Jessup et al. ......................... 297/474
5,823,627 * 10/1998 Viano et al. ......................... 297/471
6,045,186 * 4/2000 Butt et al. ............................ 297/296
6,145,881 * 11/2000 Miller, III et al. ................. 280/806

FOREIGN PATENT DOCUMENTS 3401529   7/1985  (DE) .
3740937   6/1989  (DE) .
3818920  12/1989  (DE) .
2278535  12/1994  (GB) .

* cited by examiner

Primary Examiner—Paul N. Dickson
(74) Attorney, Agent, or Firm—Baker Botts L.L.P.

(57) ABSTRACT

A passenger safety belt restraint arrangement for a center seat in a vehicle has a height-adjustable shoulder belt in the shoulder area of a passenger. For this purpose, a height-adjustable mount which has a height-adjustable diverter for the shoulder belt at its highest point is provided in the upper backrest area of the center seat.

3 Claims, 2 Drawing Sheets

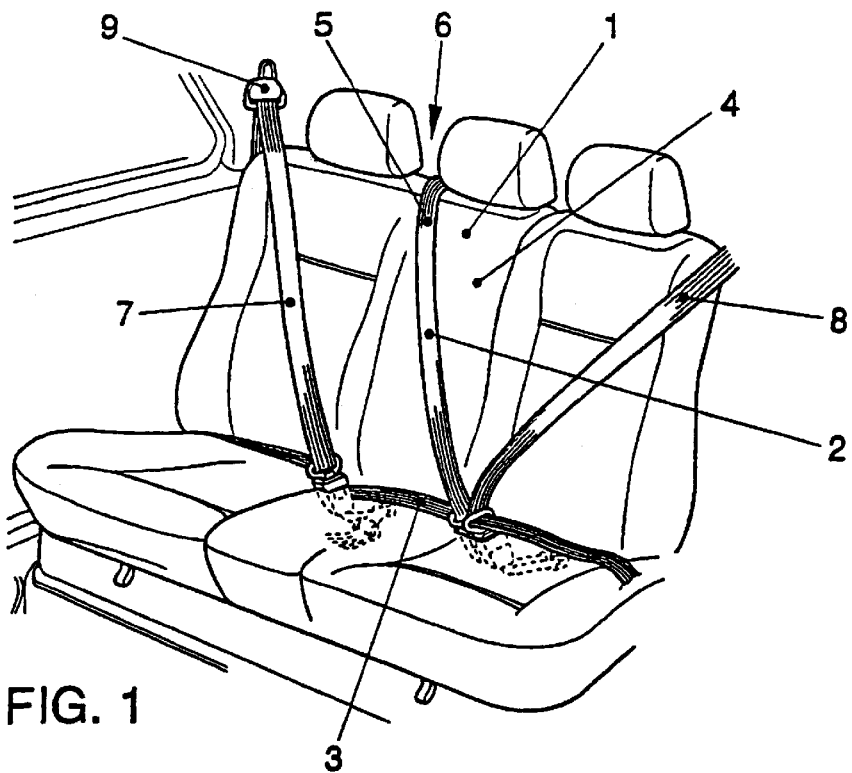
FIG. 1
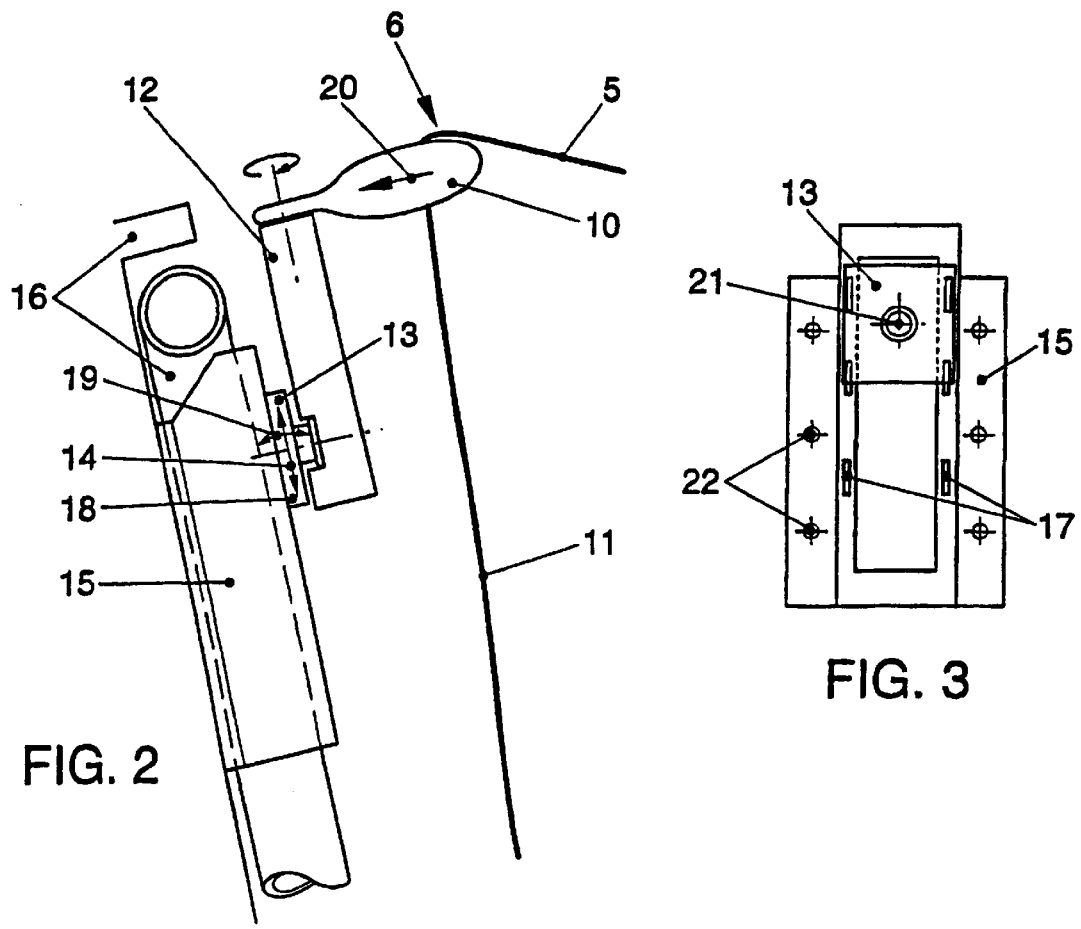
FIG. 2
FIG. 3

PASSENGER SAFETY BELT RESTRAINT ARRANGEMENT

REFERENCE TO RELATED APPLICATION

This application is a continuation of International Application No. PCT/EP98/07358 filed Nov. 17, 1998.

BACKGROUND OF THE INVENTION

This invention relates to passenger safety belt restraint arrangements for a center seat in a vehicle including a shoulder belt with an adjustable support in the seat backrest.

It is generally known to use lap belts as restraint devices for center seats in motor vehicles. On the other hand, additional safety belts in the form of shoulder belts are provided for the outside seats. The combination of a shoulder belt and a lap belt provides far greater safety for the user than does a lap belt alone.

British Patent No. 2,278,535 discloses a passenger restraint arrangement in which a mount incorporating a belt guide element can move relative to a seat frame between a neutral position and a working position. The mount, which is slidable by a guide element along the seat frame, can be locked in various positions. In the working position, the mount projects beyond the upholstery of the seat and thus permits easy positioning of the shoulder belt across the body of the occupant.

German Patent No. 37 40 937 discloses an arrangement for mounting safety belts in which a belt guide element is associated with a rear shelf of the vehicle. This mount, which is supported on a sliding rod, is adjustable in height relative to the rear shelf and can be locked in various positions.

German Patent No. 34 01 529 describes an arrangement for adjusting an articulation point for a safety belt which can be located, for example, at approximately shoulder height in the vicinity of the B pillar or C pillar on the inside of the vehicle body. Depending on the height of the user, the articulation point for the safety belt can be moved upward or downward so that the shoulder belt is positioned correctly, not too high and not too low, on the user's body.

A shoulder belt can only have the desired safety effect if the belt can be put on correctly, which is to say that the upper articulation point of the shoulder belt must be adjustable in height to adapt to the body height of the user. Since appropriate options for attachment often are lacking in the vicinity of the center seats of a vehicle, shoulder belts frequently are not provided there. In some vehicle models, a third three-point belt is known having an upper articulation point which is connected either through a guide to a rear vehicle pillar or directly to the vehicle roof.

SUMMARY OF THE INVENTION

Accordingly, it is an object of the present invention to provide a passenger safety belt restraint arrangement which overcomes disadvantages of the prior art.

Another object of the invention is to provide a safety belt restraint arrangement which includes a safety belt for the occupants of center seats and provides the convenience of a belt while assuring a high degree of safety with good operability.

These and other objects of the invention are attained by providing a passenger safety belt restraint arrangement for a center seat having a mount for a shoulder belt which is adjustably supported from the frame of the passenger seat.

The safety belt arrangement thus includes a shoulder belt that is received in the upper region of the backrest of the center seat in a mount that is attached to the frame of the center seat so as to be adjustable in height and that extends above the upholstery of the center seat. Thus, the position of the shoulder belt can be adapted to the shoulder height of each individual user, providing a restraint arrangement in the vicinity of a center seat that assures a high degree of safety. Furthermore, the mount has an adjustable-height guide element about which the shoulder belt is guided to an automatic belt retractor of a conventional type in which, in the event of an accident, the automatic belt retractor locks the take-up mechanism so that the safety belt cannot unwind from the belt retractor. In order to be freely accessible to the user, the mount is attached by an adapter to a lockable slide which can be released from a locked condition by a compressive force exerted on the adapter through the guide element. The adapter is pivotable relative to the slide and can release the slide from the locked position by a tilting motion.

Therefore, it is possible to adjust the mount, which constitutes an adjustable-height articulation point for the shoulder belt, using light pressure on the mount while simultaneously sliding the mount vertically until it is released in a desired vertical position and thereby locked. The shoulder belt passing over the shoulder of a belt user exerts a constant tensile force on the mount as a result of the tensile force produced by the automatic belt retractor. This constant tensile force additionally counteracts any unintended release of the mount from the locked condition.

Preferably, an elongated adapter is attached to the slide and projects upward so that the mount projects forward from the backrest at the upper end of the adapter. The adapter makes it possible to use a conventional height adjustment element with a lockable, adjustable-height slide arranged on the adapter. The slide can engage locking slots at various height positions and can be tilted by a compressive force exerted on the upper end of the adapter in such a way that it is released from the locking slots.

The adjustable-height mount can also be designed so that it is locked in the height position in which it has been set by the tensile force exerted on the belt by the automatic belt retractor. However, additional spring elements can also be provided in the vicinity of the slide that press the slide into the current locked position, as is the case in the aforementioned German Patent No. 34 01 529.

A passenger safety belt restraint arrangement in accordance with the invention has the advantages that it permits three child seats to be arranged next to each other on the rear bench seat of a vehicle and it also permits a child seat to be placed in the center seat in the rear-facing position. Furthermore, accident-related forward displacement of an occupant of the center seat is reduced to a minimum.

BRIEF DESCRIPTION OF THE DRAWINGS

Further objects and advantages of the invention will be apparent from a reading of the following description in conjunction with the accompanying drawings, in which:

FIG. 1 is a perspective view showing a rear seat bench of a motor vehicle in which the center seat has a passenger safety belt restraint arrangement with a shoulder belt according to the invention;

FIG. 2 is a schematic vertical sectional view showing an adjustable-height mount for a shoulder belt supported on the frame of a backrest of the center seat shown in FIG. 1;

FIG. 3 is a top view of a lockable, adjustable-height slide, upon which the adjustable mount shown in FIG. 2 can be installed by use of an adapter;

DESCRIPTION OF PREFERRED EMBODIMENT

Figure 4:
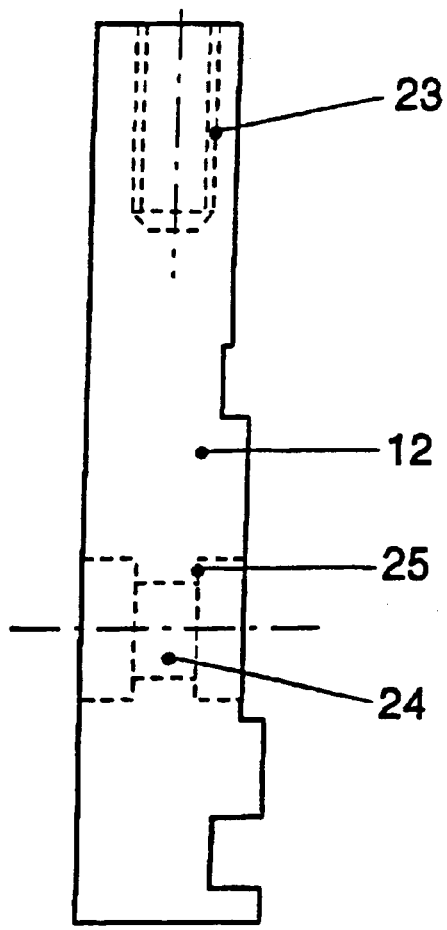
FIG. 4 is a side view of the adapter shown in FIG. 2.

The typical embodiment of a motor vehicle rear seat bench shown in FIG. 1 is equipped with a passenger safety belt restraint arrangement that not only has shoulder belts for each of the outer seat positions located on the sides of the seat, but also has a shoulder belt for the center seat 1 of the rear seat bench. The safety belt arrangement 2 for the center seat 1 constitutes a lap belt 3 in the lower region and, in the vicinity of the backrest 4, a shoulder belt 5 that extends diagonally upward. At its highest point 6, the shoulder belt 5 is supported at the desired height position by an adjustable-height mount that is concealed in the seat back in the view shown in FIG. 1. Safety belts 7 and 8 for the side seats are supported in conventional, adjustable-height belt guides mounted on the outside rear pillars, the guide 9 for the safety belt 7 being shown in FIG. 1.

In the sectional view FIG. 2, the upper section of the backrest 4 for the center seat is shown schematically, without its upholstery cushioning. At the highest point 6 of the shoulder belt 5 there is an adjustable height mount 10 that provides a guide for the shoulder belt 5 so that the belt is redirected downward to an automatic belt retractor which is not shown in the drawing. The part 11 of the shoulder belt 5 leading downward can be guided so that it is concealed in the backrest 4 shown in FIG. 1 for the center seat position.

The adjustable mount 10 is attached, if necessary in a pivotable manner, by an elongated adapter 12 to a slide 13 that is vertically adjustable and is lockable in various height positions. A double arrow 14 indicates the adjustability of the slide in height. The slide 13 is part of a conventional adjusting mechanism 15 that is attached to the frame 16 of the center seat 1. The adjusting mechanism 15 has locking slots 17 which are visible in the top view of FIG. 3. Locking of the slide 13 is accomplished by tabs 18 which protrude from the underside of the slide to engage in corresponding locking slots 17.

In order to release the slide 13 from the locked condition, the slide can be tilted so that the tabs 18 lift out of the locking slots 17. The tilting motion required for this purpose, which is indicated by the curved double arrow 19 in FIG. 2, is accomplished by applying force to the mount 10 in the direction shown by the arrow 20 in FIG. 2. When the mount 10 is in the desired height position the tilting force is released, permitting the slide 13 to move from the tilted position to the locked position shown in FIG. 2 in which the tabs 18 are received in slots 17.

FIG. 3 shows the adjusting mechanism 15 with the adjustable slide 13, which has a threaded hole 21 for attachment of the adapter 12. The adjusting mechanism 15 has several attachment holes 22 which are used for screw attachment to the frame 16 of the backrest 1.

Figure 5:
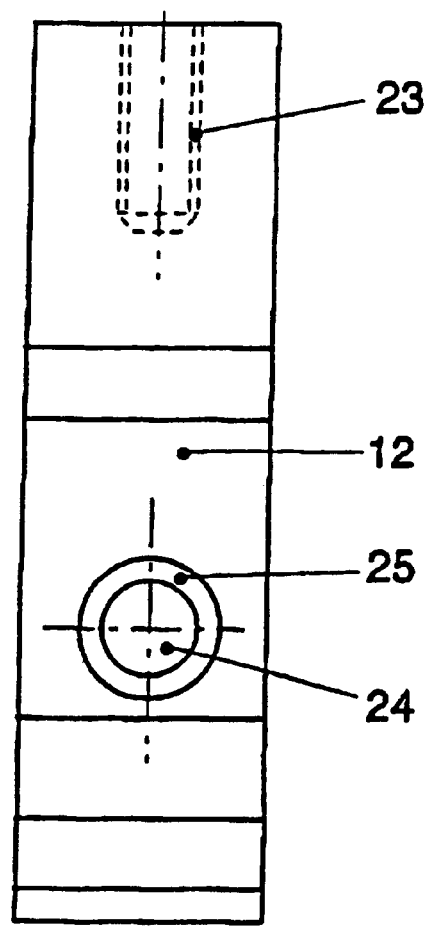
FIG. 5 is a rear view of the adapter shown in FIG. 2.

The adapter 12, shown in FIGS. 4 and 5, has a threaded hole 23 at its upper end for attachment of the mount 10. In its lower half, the adapter 12 has a through-hole 24 with an annular shoulder 25 which receives a mounting screw threaded into in the threaded hole 21 of the slide 13.

The outer shape of the adapter 12 is matched to that of the slide 13 so that a secure connection with the slide 13 is possible. Moreover, the adapter 12 and the mount 10, which serves as a guide, are sized so that the mount 10 can be grasped by the user of the shoulder belt 5 in order to be able to release the locked state by exerting a titlting force on the mount 10, and to slide the mount 10 into the desired vertical position. Thus, the mount 10 is supported on the backrest of the center seat so that at least part of it protrudes out of the upholstery of the backrest to be accessible to a passenger in the seat.

Although the invention has been described herein with reference to a specific embodiment, many modifications and variations therein will readily occur to those skilled in the art. Accordingly, all such variations and modifications are included within the intended scope of the invention.

I claim:

1. A passenger safety belt restraint arrangement for a center seat of a vehicle comprising a shoulder belt, a mount for the shoulder belt in an upper region of a backrest of a center seat, a lockable slide supporting the mount in a vertically adjustable manner on a frame of the center seat, and a guide element extending above upholstery for the center seat about which the shoulder belt is guided toward an automatic belt retractor, wherein the mount is connected to the upper end of an adapter so as to be freely accessible by a user of the shoulder belt, the adapter being pivotable relative to the slide to permit a tilting motion of the mount to release the slide from a locked condition.

2. A passenger safety belt restraint arrangement in accordance with claim 1 wherein the lockable slide is self-locking in a selected vertical position in response to force exerted on the belt by the automatic belt retractor after the shoulder belt has been positioned with respect to a user.

3. A passenger safety belt restraint arrangement in accordance with claim 1 wherein the mount is slidable above an upper edge of the backrest of the center seat.

* * * * *